US009019351B2

(12) United States Patent
Yu et al.

(10) Patent No.: US 9,019,351 B2
(45) Date of Patent: Apr. 28, 2015

(54) THREE-DIMENSIONAL IMAGE MEASURING APPARATUS

(71) Applicant: Test Research, Inc., Taipei (TW)

(72) Inventors: Liang-Pin Yu, New Taipei (TW); Don Lin, Taipei (TW); Kuang-Pu Wen, Hsinchu (TW)

(73) Assignee: Test Research Inc., Taipei (TW)

( * ) Notice: Subject to any disclaimer, the term of this patent is extended or adjusted under 35 U.S.C. 154(b) by 398 days.

(21) Appl. No.: 13/687,639

(22) Filed: Nov. 28, 2012

(65) Prior Publication Data

US 2014/0022357 A1 Jan. 23, 2014

(30) Foreign Application Priority Data

Jul. 20, 2012 (TW) ............................. 101126240 A

(51) Int. Cl.
*H04N 7/18* (2006.01)
*H04N 13/02* (2006.01)
*G01B 11/25* (2006.01)

(52) U.S. Cl.
CPC ................ H04N 13/02 (2013.01); G01B 11/25 (2013.01); *H04N 13/0253* (2013.01)

(58) Field of Classification Search
CPC ..... H04N 13/02; H04N 13/0253; G01B 11/25
USPC ............ 348/42, 46–48, 86–88, 92, 125–128; 382/141, 144–147, 149–152, 154; 356/496–500, 511, 369, 600–602, 608, 356/611, 625, 626, 628, 629, 634–639, 356/237.2–237.6
See application file for complete search history.

(56) References Cited

U.S. PATENT DOCUMENTS

| | | | | |
|---|---|---|---|---|
| 5,495,337 A * | 2/1996 | Goshorn et al. | ............... | 356/601 |
| 5,801,832 A * | 9/1998 | Van Den Brink | ............. | 356/500 |
| 7,236,244 B1 * | 6/2007 | Yang et al. | .................... | 356/400 |
| 7,692,144 B2 * | 4/2010 | Watanabe et al. | ............. | 250/307 |
| 8,056,700 B2 * | 11/2011 | Malek et al. | .................. | 198/403 |
| 8,072,591 B2 * | 12/2011 | Markwort et al. | ......... | 356/237.2 |
| 2004/0223053 A1* | 11/2004 | Gladnick et al. | ................ | 348/79 |

(Continued)

FOREIGN PATENT DOCUMENTS

| | | |
|---|---|---|
| TW | 1258592 | 7/2006 |
| TW | 200935333 | 8/2009 |

*Primary Examiner* — Victor Kostak
(74) *Attorney, Agent, or Firm* — Merchant & Gould P.C.

(57) ABSTRACT

A three-dimensional image measuring apparatus includes a measurement platform, a movable optical head, a three-dimensional calculator module, a moving module and a calibration controlling module. The movable optical head includes a beam splitter unit, a projecting module, an image-capturing module and an indicator module. The measurement platform supports an object under measurement. The projecting module generates a structure light of parallel sinusoid strips pattern to the object under measurement. The image-capturing module includes image-capturing units facing the object under measurement from different directions or angles. Each image-capturing unit is configured to capture a reflection image which is formed from the structure light of parallel sinusoid strips pattern reflected by the object under measurement. The indicator module projects an alignment beam onto the object under measurement for forming an alignment mark. The calibration controlling module selectively drives the moving module to move the movable optical head according to the alignment mark.

15 Claims, 7 Drawing Sheets

(56) References Cited

U.S. PATENT DOCUMENTS

| | | | |
|---|---|---|---|
| 2006/0038980 A1* | 2/2006 | Naka et al. | 356/73 |
| 2007/0120977 A1* | 5/2007 | Duquette et al. | 348/87 |
| 2010/0188499 A1* | 7/2010 | Amanullah et al. | 348/87 |
| 2011/0002527 A1 | 1/2011 | Jeong et al. | |
| 2011/0050893 A1 | 3/2011 | Lee et al. | |
| 2012/0013899 A1* | 1/2012 | Amanullah | 356/237.5 |
| 2012/0242826 A1* | 9/2012 | Holmes | 348/92 |
| 2012/0318775 A1* | 12/2012 | Schwarz | 219/121.63 |

* cited by examiner

THREE-DIMENSIONAL IMAGE MEASURING APPARATUS

RELATED APPLICATIONS

This application claims priority to Taiwan Application Serial Number 101126240, filed Jul. 20, 2012, which is herein incorporated by reference.

BACKGROUND

1. Field of Invention

The invention relates to a three-dimensional image measuring apparatus. More particularly, the invention relates to an optical configuration in the three-dimensional image measuring apparatus.

2. Description of Related Art

The application of two-dimensional automatic optical inspection (AOI) in the printed circuit board assembly (PCBA) process has reached quite a mature stage. The two-dimensional inspection technology involves performing PCBA inspection using one or more image-capturing apparatuses in coordination with multi-color angle light, so as to manage and control PCBA quality. However, in recent years, due to increased inspection requirements, three-dimensional measuring technology is being gradually adopted, and is replacing the conventional two-dimensional automatic optical inspection technology as it is able to overcome the limitations or disadvantages thereof.

With respect to the method of measuring a three-dimensional shape of an object under measurement, a common conventional measuring method, for example that using fringe pattern projection, involves projecting a structure light of parallel sinusoid strips pattern onto the object under measurement by a projecting module, and based on a phase-shift method, reconstructs the three-dimensional shape of the object under measurement from the reflection image thereof.

In the phase-shift method, a plurality (3 or more) of reflection images from the structure light of parallel sinusoid strips pattern are first captured, and these reflection images can be analyzed taking into consideration a form of the structure light of parallel sinusoid strips pattern and a height of a measurement plane to reconstruct the three-dimensional shape of the object under measurement.

SUMMARY

In order to solve the problems of the prior art, a technical aspect of the invention provides a three-dimensional image measuring apparatus. The three-dimensional image measuring apparatus uses a projecting module to generate a structure light of parallel sinusoid strips pattern and projects the structure light of parallel sinusoid strips pattern onto an object under measurement through an optical beam splitter. Subsequently the three-dimensional image measuring apparatus uses plural image-capturing modules to capture images from different directions or angles of the object under measurement, such as right above and in the obliquely upward direction of the object under measurement. Next, the phase of the structure light of parallel sinusoid strips pattern generated by the projecting module is adjusted in a time-sequential manner, and further based on a phase-shift method. The three-dimensional surface profile of the object under measurement is calculated from the reflection images captured at different phases by the above-mentioned plural image-capturing modules with different angles.

Since the image-capturing module of the three-dimensional image measuring apparatus does not capture an image of the object under measurement through a reflector, not only is a light path acting surface reduced to thereby minimize the influence of vibration, but system cost is also reduced. Furthermore, the three-dimensional image measuring apparatus of the invention is further provided with an indicator module, and can position the object under measurement and calculate PCB surface-bending of the object under measurement through an alignment beam projected by the indicator module.

An aspect of the invention provides a three-dimensional image measuring apparatus. The three-dimensional image measuring apparatus includes a measurement platform, a movable optical head, a moving module and a calibration controlling module. The measurement platform supports an object under measurement. The movable optical head includes a beam splitter unit, a projecting module, an image-capturing module, an indicator module and a three-dimensional calculator module. The beam splitter unit is located above the measurement platform. The projecting module generates a structure light of parallel sinusoid strips pattern. The structure light of parallel sinusoid strips pattern is projected onto the object under measurement through the beam splitter unit. The image-capturing module includes a plurality of image-capturing units. The image-capturing units are located above the measurement platform facing the object under measurement from different directions or angles. Each image-capturing unit is configured to capture a reflection image which is formed from the structure light of parallel sinusoid strips pattern reflected by the object under measurement. The indicator module is located above the measurement platform and obliquely faces the measurement platform. The indicator module projects an alignment beam onto the object under measurement for forming an alignment mark. The three-dimensional calculator module calculates a three-dimensional image with respect to the object under measurement according to these reflection images. The movable optical head, sitting on the moving module, moves around and takes images of the object under measurement. The calibration controlling module selectively drives the moving module to move the movable optical head according to the alignment mark in these reflection images.

According to an embodiment of the invention, the image-capturing module includes a plurality of first image-capturing units and a second image-capturing unit. The first image-capturing units are located above the measurement platform and obliquely face the measurement platform. Each of the first image-capturing units is configured to be able to capture both an oblique reflection image which is formed from the structure light of parallel sinusoid strips pattern reflected and an oblique reflection image which is formed from the annular auxiliary light source module by the object under measurement. The second image-capturing unit captures an image of the object under measurement from a vertical angle through the beam splitter unit to generate a forward reflection image from the structure light of parallel sinusoid strips pattern reflected by the object under measurement.

According to another embodiment of the invention, when the three-dimensional image measuring apparatus is in a three-dimensional measuring mode, the three-dimensional calculator module calculates the three-dimensional image with respect to the object under measurement according to the oblique reflection images.

According to a further embodiment of the invention, when the three-dimensional image measuring apparatus is in a two-dimensional photography mode, the second image-capturing unit captures the forward reflection image as a two-dimensional image of the object under measurement.

According to still a further embodiment of the invention, the structure light of parallel sinusoid strips pattern that is projected onto the object under measurement by the beam splitter unit has an optical axis. The first image-capturing units are arranged around the optical axis.

According to yet still a further embodiment of the invention, the projecting module includes a light source, a grating device and a grating device mover. The grating device is located between the light source and the beam splitter unit for converting a light generated by the light source into the structure light of parallel sinusoid strips pattern. The grating device mover actuates the grating device to move laterally relative to the light source, so as to change a phase of the structure light of parallel sinusoid strips pattern.

According to an embodiment of the invention, the projecting module includes a light source and a grating device. The grating device is located between the light source and the beam splitter unit for converting a light generated by the light source into the structure light of parallel sinusoid strips pattern. The moving module enables the movable optical head to move horizontally relative to the object under measurement, so as to equivalently change a phase of the structure light of parallel sinusoid strips pattern that is projected onto the object under measurement.

According to another embodiment of the invention, the alignment mark includes a single feature pattern for alignment. The indicator module includes a laser emission component for projecting the alignment mark.

According to a further embodiment of the invention, the alignment mark includes multiple feature patterns for alignment. The indicator module includes a plurality of laser emission components for projecting the alignment mark.

According to still a further embodiment of the invention, the calibration controlling module selects at least one of these reflection images, and determines whether the alignment mark in the selected reflection image departs from a predetermined position, so as to selectively drive the moving module to move the movable optical head.

According to yet still a further embodiment of the invention, when the alignment mark departs from the predetermined position, the calibration controlling module drives the moving module according to a departing direction and a departing distance of the alignment mark relative to the predetermined position.

Another aspect of the invention provides a three-dimensional image measuring apparatus. The three-dimensional image measuring apparatus includes a measurement platform, a movable optical head, a three-dimensional calculator module, a moving module and a calibration controlling module. The measurement platform supports an object under measurement. The movable optical head includes a beam splitter unit, a projecting module, an image-capturing module and an indicator module. The movable optical head is located above the measurement platform. The beam splitter unit is located above the measurement platform. The projecting module generates a structure light of parallel sinusoid strips pattern. The structure light of parallel sinusoid strips pattern is projected onto the object under measurement through the beam splitter unit. The image-capturing module includes a plurality of image-capturing units. The image-capturing units are located above the measurement platform facing the object under measurement from different directions or angles. Each image-capturing unit is configured to capture a reflection image which is formed from the structure light of parallel sinusoid strips pattern reflected by the object under measurement. The indicator module is located above the measurement platform and obliquely faces the measurement platform. The indicator module projects an alignment beam onto the object under measurement for forming an alignment mark. The three-dimensional calculator module calculates a three-dimensional image with respect to the object under measurement according to these reflection images. The moving module is operationally connected to the movable optical head for moving the movable optical head. The calibration controlling module integrates these reflection images into an integrated image according to the respective alignment marks of these reflection images, and captures at least one part from the integrated image to form a calibration image.

According to an embodiment of the invention, the image-capturing module includes a plurality of first image-capturing units and a second image-capturing unit. The first image-capturing units are located above the measurement platform and obliquely face the measurement platform. Each of the first image-capturing units is configured to capture an oblique reflection image which is formed from the structure light of parallel sinusoid strips pattern reflected by the object under measurement. The second image-capturing unit captures an image of the object under measurement from a vertical angle through the beam splitter unit to generate a forward reflection image from the structure light of parallel sinusoid strips pattern reflected by the object under measurement.

According to another embodiment of the invention, when the three-dimensional image measuring apparatus is in a three-dimensional measuring mode, the three-dimensional calculator module calculates the three-dimensional image with respect to the object under measurement according to the oblique reflection images.

According to a further embodiment of the invention, when the three-dimensional image measuring apparatus is in a two-dimensional photography mode, the second image-capturing unit captures the forward reflection image as a two-dimensional image of the object under measurement.

BRIEF DESCRIPTION OF THE DRAWINGS

In order to make the foregoing as well as other purposes, features, advantages, and embodiments of the invention more apparent, the accompanying drawings are described as follows.

DETAILED DESCRIPTION

Figure 1A:
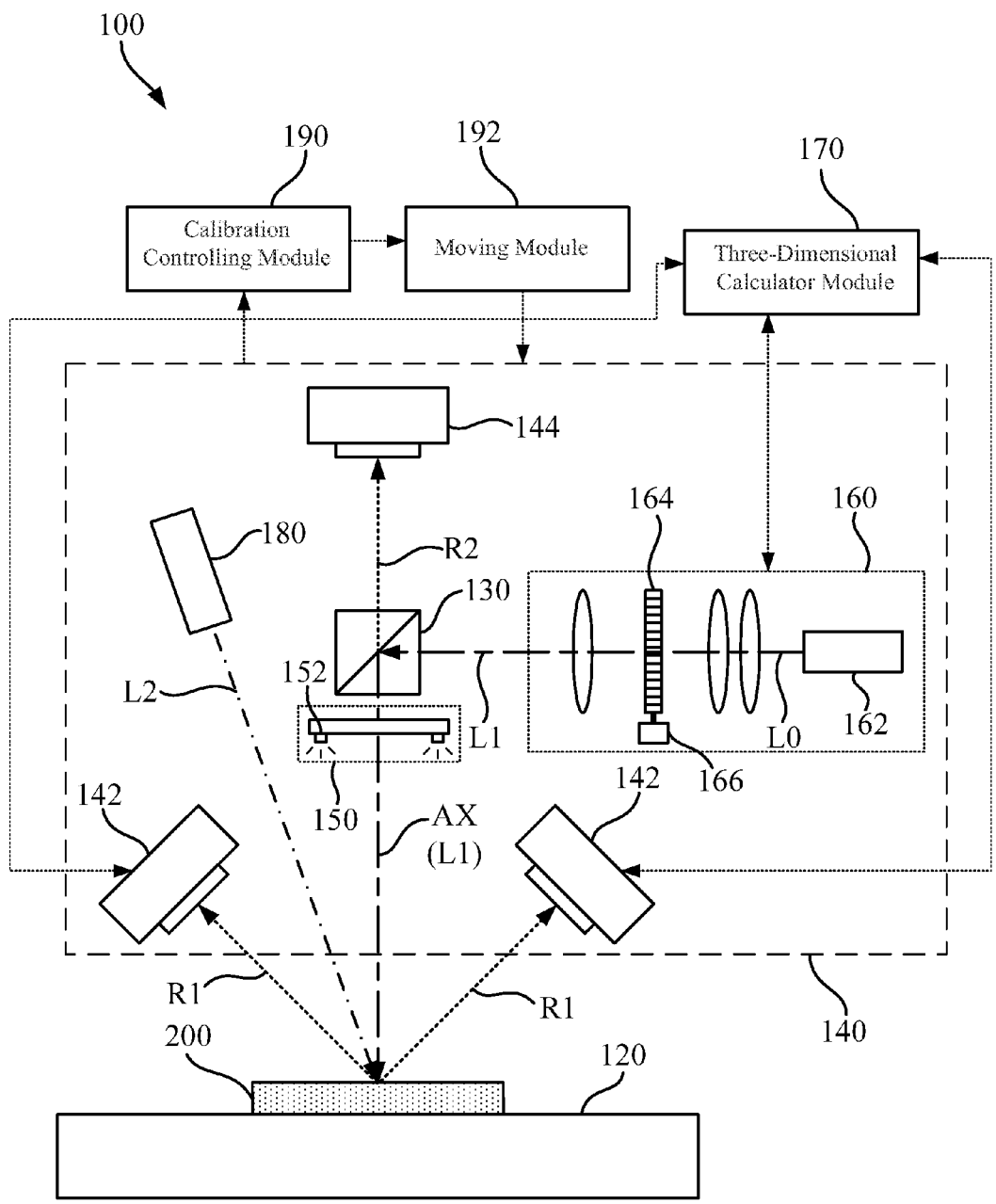
FIG. 1A shows a schematic view of a three-dimensional image measuring apparatus according to an embodiment of the invention.

A plurality of embodiments of the invention will be disclosed hereafter with reference to the drawings. For purposes of clear illustration, many details of practical applications will be described in the following disclosure. However, it should be understood that these details of practical applications are not intended to limit the invention. That is, in some embodiments of the invention, these details are not necessary. Furthermore, for purpose of simplifying the drawings, some conventional structures and components in the drawings will be shown schematically.

Referring to FIG. 1A, which is a schematic view of a three-dimensional image measuring apparatus 100 according to an embodiment of the invention, the three-dimensional image measuring apparatus 100 includes a measurement platform 120, a movable optical head 140, a three-dimensional calculator module 170, a calibration controlling module 190 and a moving module 192. In this embodiment, the movable optical head 140 includes internal components such as a beam splitter unit 130, an image-capturing module including an image-capturing unit 142 and an image-capturing unit 144, a projecting module 160 and an indicator module 180.

The measurement platform 120 supports an object 200 under measurement.

The beam splitter unit 130 is located above the measurement platform 120. In an actual application, the beam splitter unit 130 may include a polarizing beam splitter (PBS). The PBS can selectively reflect the light or allow the light to penetrate in a straight line according to the direction of the polarized light.

The projecting module 160 generates a structure light of parallel sinusoid strips pattern L1. The structure light of parallel sinusoid strips pattern L1 is projected onto the object 200 under measurement through the beam splitter unit 130. In this embodiment, the projecting module 160 includes a light source 162, a grating device 164 and a grating device mover 166. The grating device 164 is a lens having a plurality of light-proof stripes. The light-proof stripes are spaced a specific pitch from each other. The grating device 164 converts a light L0 generated by the light source 162 into the structure light of parallel sinusoid strips pattern L1. The projecting module 160 further includes the grating device mover 166 for moving the grating device 164 along a direction perpendicular to the light-proof stripes, and thus forming various phases of the structure light of parallel sinusoid strips pattern L1.

In this embodiment, the image-capturing module includes a plurality of image-capturing units, such as two first image-capturing units 142 and a second image-capturing unit 144, as shown in FIG. 1A. These image-capturing units 142, 144 are located above the measurement platform 120 facing the object 200 under measurement from different directions or angles. Each of the image-capturing units 142, 144 is configured to capture reflection images R1, R2 which are formed from the structure light of parallel sinusoid strips pattern L1 reflected by the object 200 under measurement. In this embodiment, image-capturing units 142, 144 of the image-capturing module can move along three directional axes (e.g., X, Y and Z axes) relative to the measurement platform 120, so as to obtain images of the object 200 under measurement from various angles.

As shown in FIG. 1A, the image-capturing module includes a plurality of first image-capturing units 142, such as the two first image-capturing units 142 in this embodiment, but the invention is not limited in this regard. The first image-capturing units 142 are located above the measurement platform 120 and obliquely face the measurement platform 120. Each of the first image-capturing units 142 is configured to capture the oblique reflection image R1 which is formed from the structure light of parallel sinusoid strips pattern L1 reflected by the object 200 under measurement.

The structure light of parallel sinusoid strips pattern L1, which is reflected to the object 200 under measurement by the beam splitter unit 130, has an optical axis AX. The above-mentioned first image-capturing units 142 are arranged around the optical axis AX. For example, in other embodiments, the image-capturing module may include three first image-capturing units 142 arranged around the optical axis AX, in which the first image-capturing units are located respectively at 0 degrees, 120 degrees and 240 degrees; four first image-capturing units 142, in which the first image-capturing units are located respectively at 0 degrees, 90 degrees, 180 degrees and 270 degrees; or any other number of the first image-capturing units 142 which are arranged evenly or unevenly around the optical axis AX.

Furthermore, the image-capturing module further includes the second image-capturing unit 144. The second image-capturing unit 144 is located above the beam splitter unit 130 and vertically faces the measurement platform 120 and the beam splitter unit 130. The second image-capturing unit 144 is configured to capture a forward reflection image R2 which is formed from the structure light of parallel sinusoid strips pattern L1 reflected by the object 200 under measurement and passed through the beam splitter unit 130.

Through use of the above-mentioned plural image-capturing units 142, 144, the image-capturing module in the invention can collect the reflection images R1, R2 simultaneously from different directions or angles.

Figure 1B:
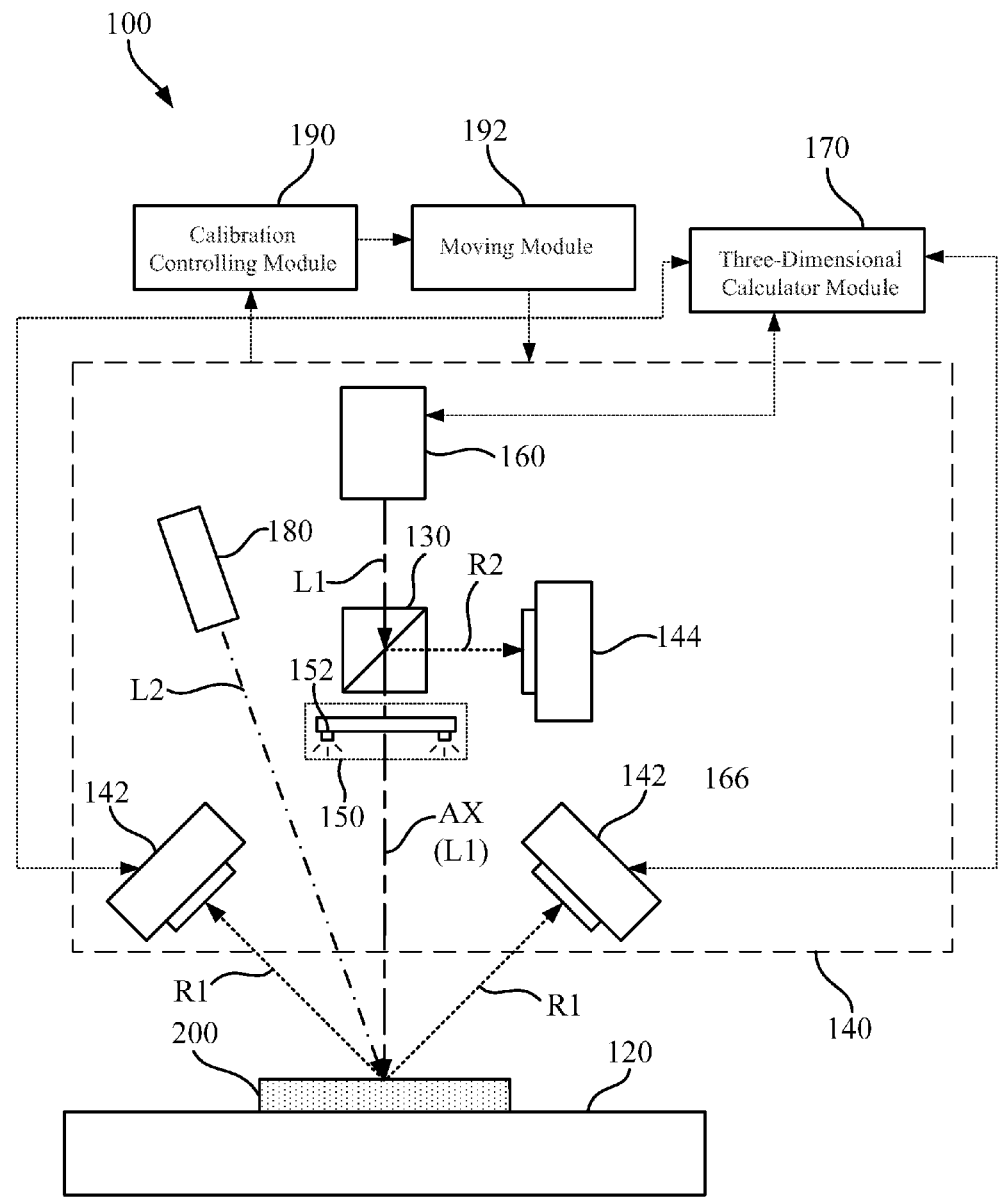
FIG. 1B shows a schematic view of a three-dimensional image measuring apparatus according to another embodiment of the invention.

Furthermore, in the embodiment of FIG. 1A, the second image-capturing unit 144 is located above the beam splitter unit 130 and vertically faces the measurement platform 120 and the beam splitter unit 130. The projecting module 160 is located to one side of the beam splitter unit 130. The structure light of parallel sinusoid strips pattern L1 is projected onto the object 200 under measurement after its direction is changed by refraction of the beam splitter unit 130. However, the positions of the second image-capturing unit 144 and the projecting module 160 of the invention are not limited to those shown in FIG. 1A. In another embodiment, the positions of the second image-capturing unit 144 and the projecting module 160 may be interchanged. As shown in the embodiment of FIG. 1B, the second image-capturing unit 144 may be disposed to one side of the beam splitter unit 130 and capture an image of the object 200 under measurement from a vertical angle after its direction is changed through refraction of the beam splitter unit 130. The projecting module 160 is configured above the beam splitter unit 130 and vertically faces the measurement platform 120. The structure light of parallel sinusoid strips pattern L1 generated by the projecting module 160 penetrates the beam splitter unit 130 to be projected onto the object 200 under measurement. In the embodiment shown in FIG. 1B, a similar operation also can be realized after the positions of the second image-capturing unit 144 and the projecting module 160 are interchanged.

In an actual application, for different image-capturing modes (such as a three-dimensional measuring mode, a two-dimensional photography mode and a board-bending calibration mode), the three-dimensional image measuring apparatus 100 of this embodiment may be formed by different image-capturing units 142, 144 in the image-capturing module.

For example, in the three-dimensional measuring mode, the three-dimensional image measuring apparatus 100 in an embodiment mainly uses the reflection image R1 captured by two oblique image-capturing units 142 of the image-capturing module. The three-dimensional calculator module 170 receives the above-mentioned reflection image R1, and calculates a three-dimensional image with respect to the object 200 under measurement according to the reflection image R1 from different directions or angles. Furthermore, as the grating device mover 166 shifts the grating device 162 and forms various phase angles of the structure light of parallel sinusoid strips pattern L1, the image-capturing units 142, 144 of the image-capturing module further capture a plurality of oblique images R1, which are formed at various phase angles from the structure light of parallel sinusoid strips pattern L1 reflected by the object 200 under measurement. Through the phase shift measuring method, the phase information corresponding to various reflection images R1 at various phase angles can be obtained.

The three-dimensional calculator module 170 can calculate the three-dimensional image of the object 200 under measurement according to the phase information of various reflection images R1 at various phase angles. It should be noted that at the same time, the three-dimensional calculator module 170 calculates the three-dimensional image with respect to the object 200 under measurement according to the reflection images R1 from different directions or angles. The three-dimensional calculation is associated with an excellent determining speed and accuracy, and enables detection of the three-dimensional shape of the object 200 under measurement. In the application of component testing, the three-dimensional calculation may be used for detecting defects in the shape of the object 200 under measurement, such as a side face pit or an oblique notch. This cannot be detected by the conventional image-capturing from a single direction or angle.

As described above with respect to the aforementioned embodiment, when the three-dimensional image measuring apparatus 100 is in the three-dimensional measuring mode, the three-dimensional calculator module 170 calculates the three-dimensional image with respect to the object 200 under measurement according to these oblique reflection images R1.

In another application, the three-dimensional image measuring apparatus 100 in the invention also can be used with respect to two-dimensional photography. When the three-dimensional image measuring apparatus 100 is in the two-dimensional photography mode, the second image-capturing unit 144 captures the forward reflection image R2 directly as the two-dimensional image of the object 200 under measurement, so as to satisfy the requirements of two-dimensional photography. Furthermore, another two oblique first image-capturing units 142 of the image-capturing module also can be used simultaneously, so as to obtain the two-dimensional image of the object 200 under measurement from different image-capturing angles.

Furthermore, the three-dimensional image measuring apparatus 100 may further include an annular auxiliary light source module 150. The annular auxiliary light source module 150 may include plural light-emitting units 152. Two light-emitting units 152 are shown in the drawings, but the invention is not limited in this regard. In an actual application, the annular auxiliary light source module 150 may include three, four or more light-emitting units 152. Plural light-emitting units 152 are provided in an annular configuration and face the object 200 under measurement, so as to provide light onto the object 200 under measurement from different angles. Particularly in the two-dimensional photography mode, the projecting module 160 does not generate the structure light of parallel sinusoid strips pattern L1 used in three-dimensional measuring. Therefore it is necessary to use the annular auxiliary light source module 150 as auxiliary illumination for use as the light source of the two-dimensional photography mode.

In an actual application, the object 200 under measurement measured by the three-dimensional image measuring apparatus 100 may include a circuit board, an optical board or other substrates. A problem of board-bending may occur with the above-mentioned board in the object 200 under measurement due to the effect of an external stress or gravity. The problem of board-bending often leads to a reduction in accuracy for the three-dimensional image measuring apparatus 100 measuring the object 200 under measurement. For example, since the object 200 under measurement has a shift in the vertical direction as a result of board-bending, a predetermined measuring part on the object 200 under measurement is not on the optimal image-capturing focal length of the image-capturing units 142, 144 of the image-capturing module.

Thus, the three-dimensional image measuring apparatus 100 further includes an indicator module 180. The indicator module 180 is located above the measurement platform 120 and obliquely faces the measurement platform 120. The indicator module 180 projects an alignment beam L2 onto the object 200 under measurement for forming an alignment mark.

Figure 2:
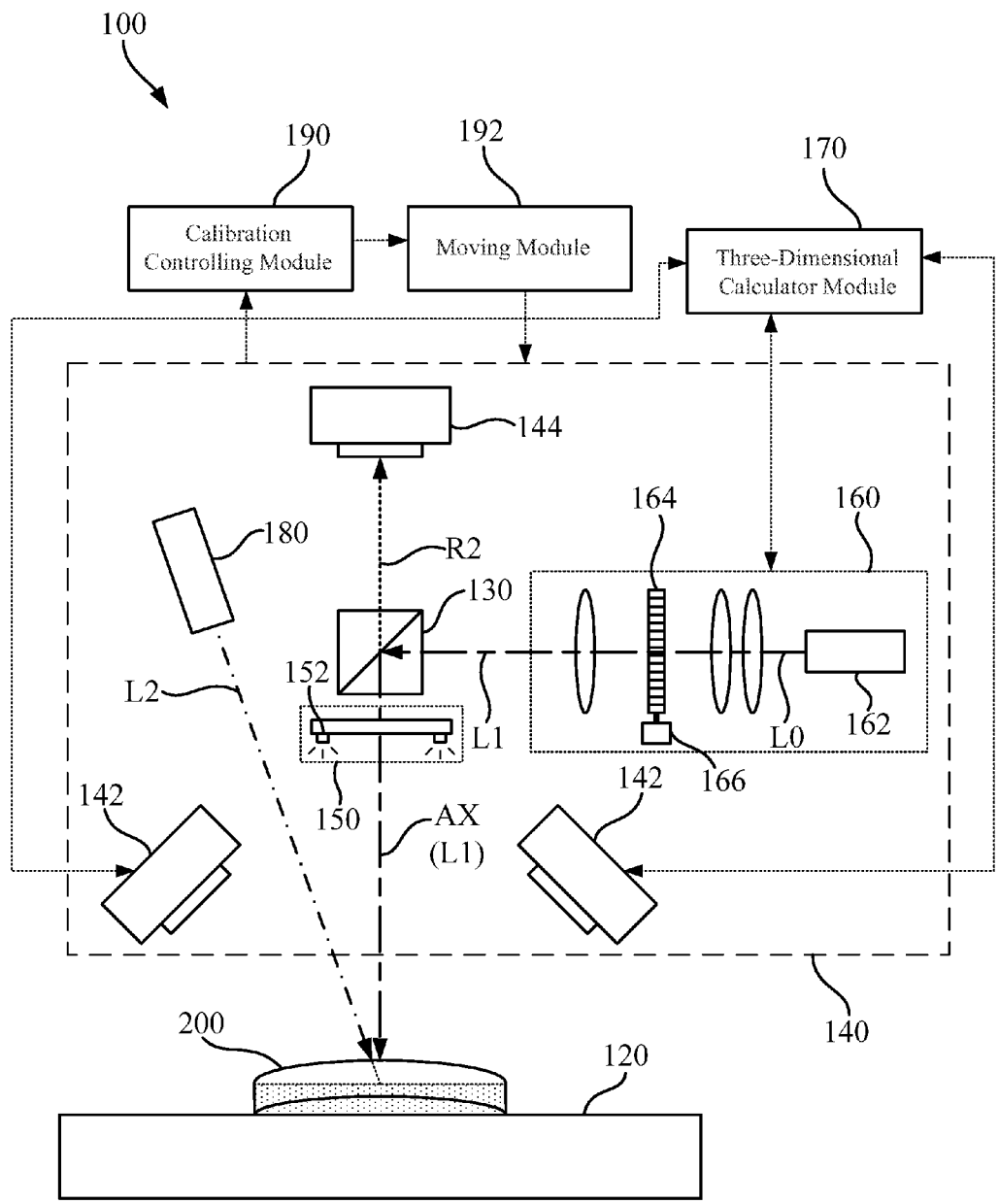
FIG. 2 shows a schematic view of the three-dimensional image measuring apparatus of FIG. 1 when board bending occurs to an object under measurement according to an embodiment of the invention.

FIG. 2 shows a schematic view of the three-dimensional image measuring apparatus 100 when board bending occurs to the object 200 under measurement according to an embodiment of the invention. Assuming that FIG. 1A shows a schematic view of the object 200 under measurement when board bending does not occur, in the embodiment of FIG. 1A, the alignment beam L2 projected by the indicator module 180 approximately falls at the center of the object 200 under measurement. As shown in FIG. 2, when board-bending occurs to the object 200 under measurement, the alignment beam L2 projected by the indicator module 180 falls at a position slightly shifted to the left of the object 200 under measurement as a result of the upward bending of the object 200 under measurement.

The calibration controlling module 190 can select at least one set of reflection images from these reflection images R1, R2 to make a determination, then based on this calibrates for the problem of board-bending for the object 200 under measurement. In an embodiment, the calibration controlling module 190 in a board-bending calibration mode mainly selects the forward reflection image R2 captured by the second image-capturing unit 144 for use in performing processing.

Figure 3:
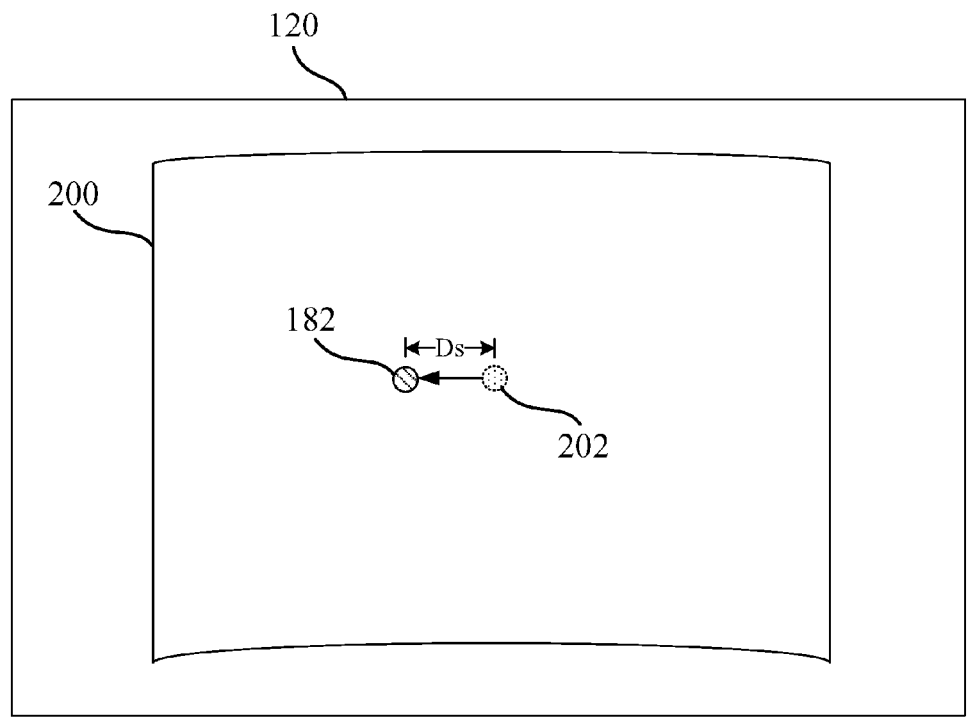
FIG. 3 shows a schematic view of a reflection image captured by the three-dimensional image measuring apparatus when board bending occurs to the object under measurement in the embodiment of FIG. 2.

FIG. 3 shows a schematic view of one of the reflection images captured by the three-dimensional image measuring apparatus 100 when board bending occurs to the object 200 under measurement in the embodiment of FIG. 2. In this embodiment, for the reflection image shown in FIG. 3, the forward reflection image R2 captured by the second image-capturing unit 144 is taken as an example, but the invention is not limited in this regard.

As shown in FIG. 3, when board bending does not occur to the object 200 under measurement, the alignment beam L2 projected by the indicator module 180 is projected onto a predetermined position 202 in FIG. 3. However, since board bending occurs to the object 200 under measurement, an alignment mark 182 generated by the alignment beam L2 projected by the indicator module 180 departs from the predetermined position 202.

The calibration controlling module 190 determines whether the alignment mark 182 departs from the predetermined position 202 according to the selected reflection image R2 as shown in FIG. 3. When the alignment mark are departed from the predetermined position, the calibration controlling module 190 drives the moving module 192 according to a departing direction (left in this embodiment) and a departing distance Ds of the alignment mark 182 relative to the predetermined position 202. The moving module 192 can move the position of the movable optical head 140 based on such driving by the calibration controlling module 190, and thus change the relative positions and distances between various image-capturing units 142, 144 and the object 200 under measurement, until the alignment mark 182 formed by the indicator module 180 on the object 200 under measurement returns back to within a range of the predetermined position 202.

In the embodiment shown in FIG. 3, the alignment mark 182 includes a single feature pattern for alignment (for example, the single feature pattern for alignment can be a point, a line, a block or a specific token). In this embodiment, the indicator module 180 may include a laser emission component for projecting the alignment mark 182. However, the alignment mark 182 in the invention is not limited to such a single feature pattern for alignment.

Figure 4:
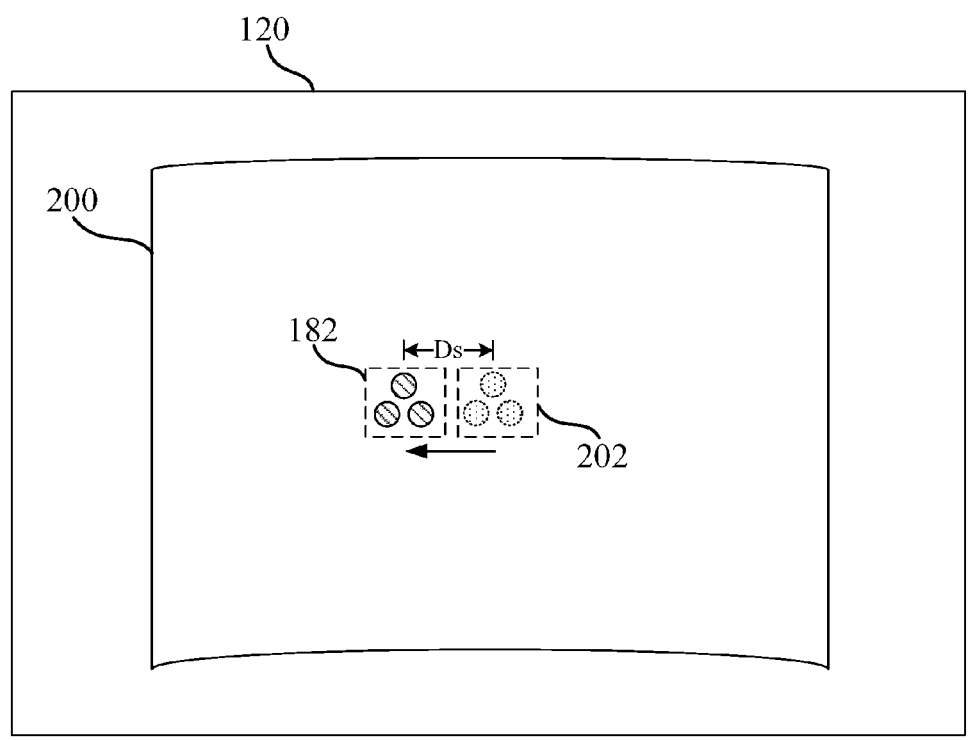
FIG. 4 shows a schematic view of reflection images captured by the three-dimensional image measuring apparatus when board bending occurs to the object under measurement in another embodiment.

FIG. 4 shows a schematic view of the reflection image captured by the three-dimensional image measuring apparatus 100 when board-bending occurs to the object 200 under measurement in another embodiment. In the embodiment of FIG. 4, the alignment mark 182 includes multiple feature patterns for alignment, so as to enhance the accuracies of the alignment mark and the board-bending calibration. In this embodiment, the alignment mark 182 includes three alignment points arranged in a regular triangle configuration, but the invention is not limited thereto (for example, the multiple feature patterns for alignment can be points, lines, blocks or some specific tokens). In this embodiment, the indicator module 182 may further include three laser emission components for projecting the alignment mark 182. The multipoint alignment pattern generated by the indicator module 180 is not limited to being arranged in a regular triangle configuration, and various equivalent alignment patterns may be used.

In summary, the three-dimensional image measuring apparatus uses the projecting module to generate the structure light of parallel sinusoid strips pattern and projects the structure light of parallel sinusoid strips pattern onto the object under measurement through the beam splitter unit. Subsequently the three-dimensional image measuring apparatus uses plural image-capturing modules to capture images from different directions or angles of the object under measurement, such as right above and in the upwardly oblique direction of the object under measurement. Next, the phase of the structure light of parallel sinusoid strips pattern generated by the projecting module is adjusted in a time-sequential manner, and further based on a phase shift method. The three-dimensional model of the object under measurement is calculated from the reflection images captured at different phases by the above-mentioned plural image-capturing modules with different angles.

Figure 5:
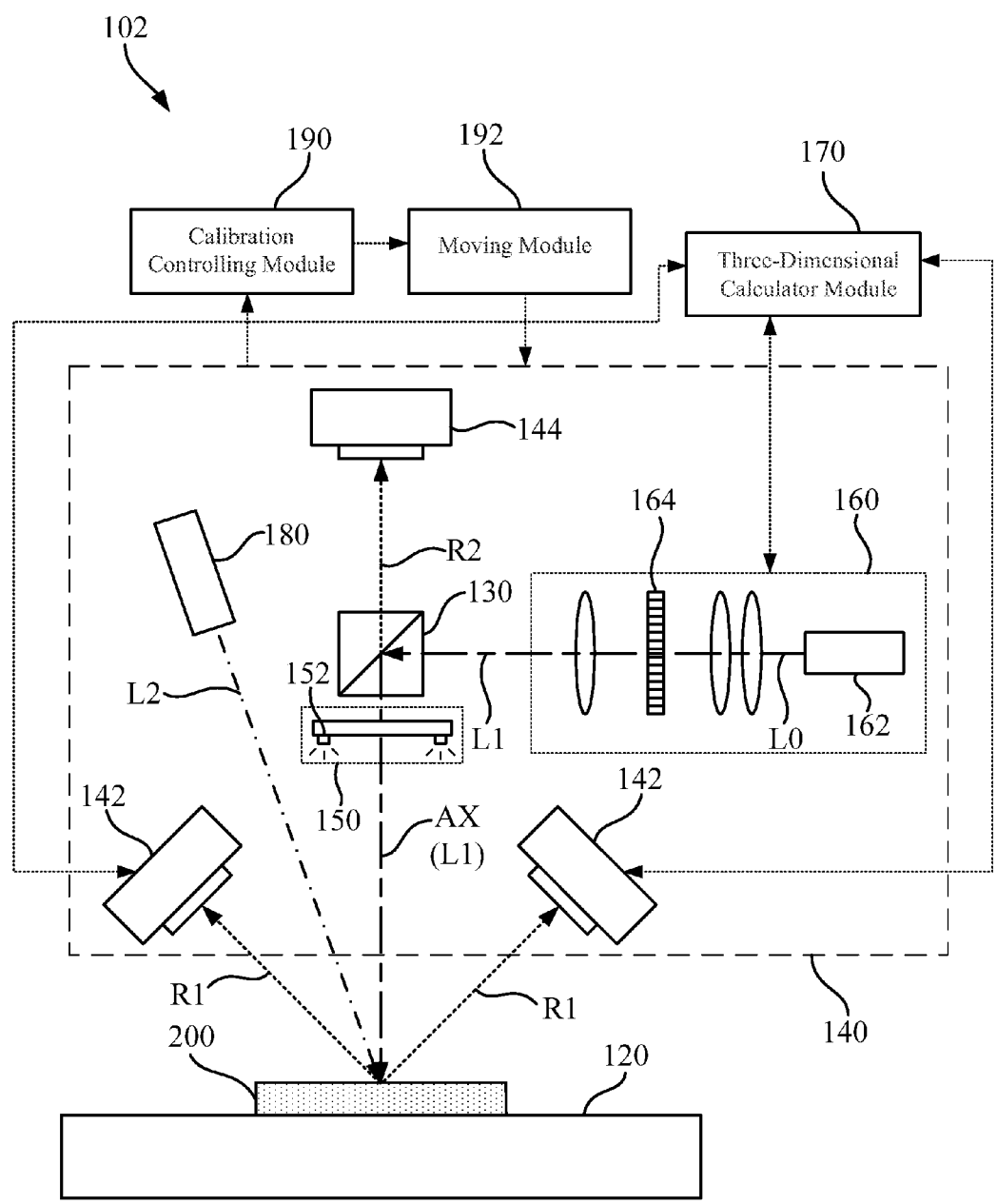
FIG. 5 shows a schematic view of a three-dimensional image measuring apparatus according to another embodiment of the invention.

In the above-mentioned embodiment, the three-dimensional image measuring apparatus 100 uses the grating device mover 166 to enable the grating device 164 to move laterally, and thus forms various phases of the structure light of parallel sinusoid strips pattern L1, but the invention is not limited to such a configuration and operation. In another embodiment, as shown in FIG. 5, which shows a schematic view of a three-dimensional image measuring apparatus 102 according to another embodiment of the invention, the three-dimensional image measuring apparatus 102 is not provided with the grating device mover 166. The moving module 192 enables the movable optical head 140 to move horizontally relative to the object 200 under measurement, so as to equivalently change the phase of the structure light of parallel sinusoid strips pattern L1 that is projected onto the object 200 under measurement, thereby realizing a similar effect.

Figure 6:
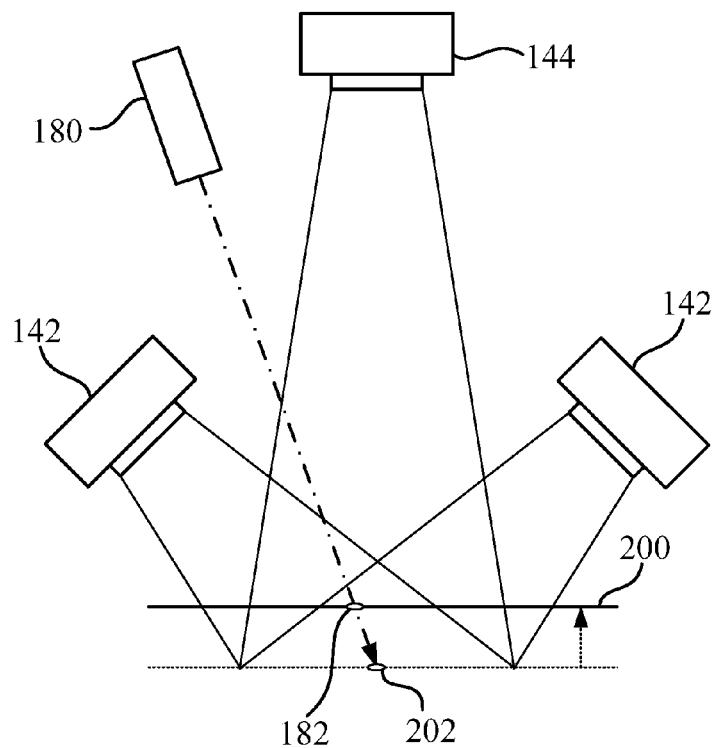
FIG. 6 shows a schematic view of image-capturing units, an indicator module and an object under measurement in an image-capturing module in another embodiment.
Figure 7:
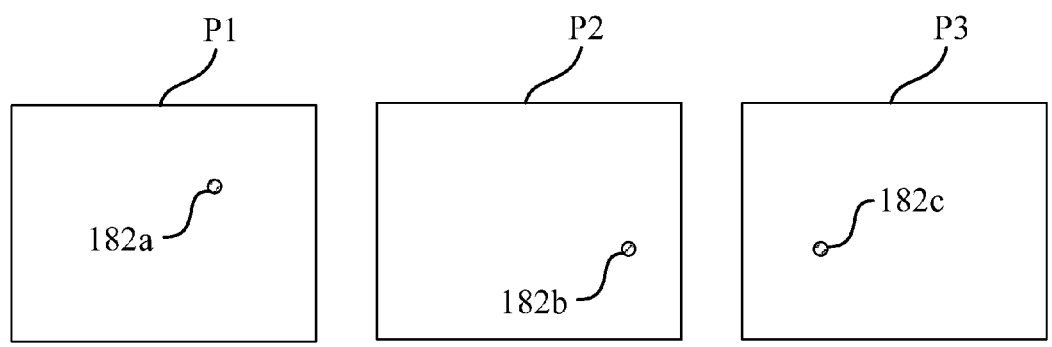
FIG. 7 shows a schematic view of reflection images captured by the image-capturing units of FIG. 6.
Figure 8:
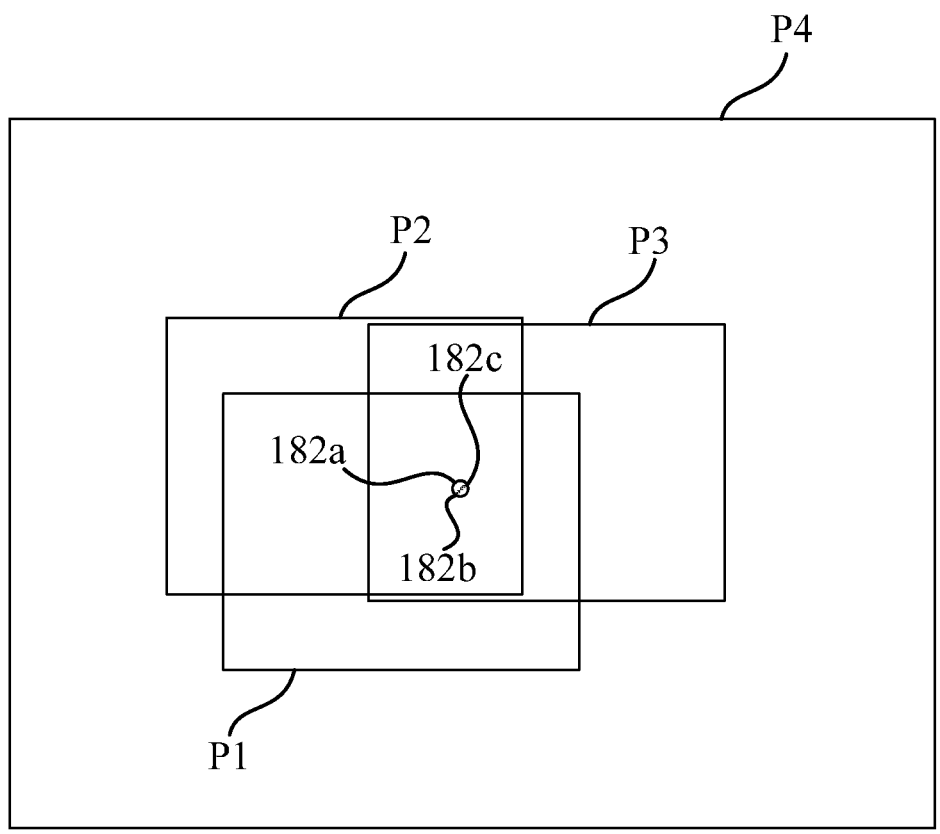
FIG. 8 shows a schematic view of an integrated image of the reflection images of FIG. 7.

Furthermore, the above-mentioned embodiment mainly changes the position of the movable optical head 140 to change the relative position and distance between various image-capturing units 142, 144 and the object 200 under measurement, so as to calibrate for board-bending, but the invention is not limited in this regard. In another embodiment, image deviation of board-bending can be compensated for by performing calculations and without moving the movable optical head 140. Referring to FIGS. 6, 7 and 8, FIG. 6 shows a schematic view of various image-capturing units 142, 144 in the image-capturing module, the indicator module 180 and the object 200 under measurement in another embodiment.

In the embodiment of FIG. 6, the horizontal height of the object 200 under measurement is raised from the lower dotted line to the upper solid line due to the problem of board-bending. Thus, the alignment mark 182 captured by various image-capturing units 142, 144 departs from the original predetermined position 202. However, since the positions and angles of various image-capturing units 142, 144 are different, the departing directions and departing levels of the alignment mark 182 captured by various image-capturing units 142, 144 are different. For example, depending on the image-capturing unit 142, 144, departing can occur towards the right, the left or the upper right.

FIG. 7 shows a schematic view of reflection images P1, P2 and P3 captured by various image-capturing units 142,144. As shown in FIG. 7, alignment marks 182a, 182b and 182c in the reflection images P1, P2 and P3 captured by various image-capturing units 142,144 are located at different positions in various images.

Thus, the calibration controlling module 190 can integrate the reflection images P1, P2 and P3 on a virtual plane. FIG. 8 shows a schematic view of an integrated image of the reflection images P1, P2 and P3. As shown in FIG. 8, the alignment marks 182a, 182b and 182c in the reflection images P1, P2 and P3 may be aligned and overlapped at the same coordinate, so as to form an integrated image P4 by integrating the three images. The calibration controlling module 190 integrates the reflection images into the integrated image P4 according to the respective alignment marks 182a, 182b and 182c in the reflection images P1, P2 and P3. Subsequently, the calibration controlling module 190 can capture at least one part from the integrated image P4 (for example, capturing the intersection part or the union part of the three images) to form a calibration image. Thus, the calibration controlling module 190 can compensate for image deviation due to board-bending by performing calculations and without moving the movable optical head 140.

Since the image-capturing module of the three-dimensional image measuring apparatus does not capture an image of the object under measurement through the reflector, not only is a light path acting surface reduced to thereby minimize the influence of vibration, but component costs are also reduced. Furthermore, the three-dimensional image measuring apparatus of the invention is further provided with the indicator module, and can position the object under measurement and calculate the board-bending of the object under measurement through the alignment beam projected by the indicator module.

Although the invention has been disclosed with reference to the above embodiments, these embodiments are not intended to limit the invention. It will be apparent to those of skills in the art that various modifications and variations can be made without departing from the spirit and scope of the invention. Thus, the scope of the invention should be defined by the appended claims.

What is claimed is:

1. A three-dimensional image measuring apparatus, comprising:
    a measurement platform for supporting an object under measurement; and
    a movable optical head located above the measurement platform, comprising:
        a beam splitter unit located above the measurement platform;
        a projecting module for generating a structure light of parallel sinusoid strips pattern, wherein the structure light of parallel sinusoid strips pattern is projected onto the object under measurement through the beam splitter unit;
        an image-capturing module comprising a plurality of image-capturing units, wherein the image-capturing units are located above the measurement platform facing the object under measurement from different directions or angles, and each image-capturing unit is configured to capture a reflection image which is formed from the structure light of parallel sinusoid strips pattern reflected by the object under measurement; and
        an indicator module located above the measurement platform and obliquely facing the measurement platform, wherein the indicator module projects an alignment beam onto the object under measurement for forming an alignment mark;
    a three-dimensional calculator module which calculates a three-dimensional image with respect to the object under measurement according to the reflection images;
    a moving module operationally connected to the movable optical head for moving the movable optical head; and
    a calibration controlling module which selectively drives the moving module to move the movable optical head according to the alignment mark in these reflection images.

2. The three-dimensional image measuring apparatus of claim 1, wherein the image-capturing module comprises:
    a plurality of first image-capturing units located above the measurement platform and obliquely facing the measurement platform, wherein each of the first image-capturing units is configured to capture an oblique reflection image which is formed from the structure light of parallel sinusoid strips pattern reflected by the object under measurement; and
    a second image-capturing unit which captures an image of the object under measurement from a vertical angle through the beam splitter unit to generate a forward reflection image from the structure light of parallel sinusoid strips pattern reflected by the object under measurement.

3. The three-dimensional image measuring apparatus of claim 2, wherein when the three-dimensional image measuring apparatus is in a three-dimensional measuring mode, the three-dimensional calculator module calculates the three-dimensional image with respect to the object under measurement according to the oblique reflection images.

4. The three-dimensional image measuring apparatus of claim 2, wherein when the three-dimensional image measuring apparatus is in a two-dimensional photography mode, the second image-capturing unit captures the forward reflection image as a two-dimensional image of the object under measurement.

5. The three-dimensional image measuring apparatus of claim 2, wherein the structure light of parallel sinusoid strips pattern that is projected onto the object under measurement by the beam splitter unit has an optical axis, and the first image-capturing units are arranged around the optical axis.

6. The three-dimensional image measuring apparatus of claim 1, wherein the projecting module comprises:
    a light source;
    a grating device located between the light source and the beam splitter unit for converting a light generated by the light source into the structure light of parallel sinusoid strips pattern; and
    a grating device mover which actuates the grating device to move laterally relative to the light source, and thus changes a phase of the structure light of parallel sinusoid strips pattern.

7. The three-dimensional image measuring apparatus of claim 1, wherein the projecting module comprises:
    a light source; and
    a grating device located between the light source and the beam splitter unit for converting a light generated by the light source into the structure light of parallel sinusoid strips pattern;
    wherein the moving module enables the movable optical head to move horizontally relative to the object under measurement, so as to equivalently change a phase of the structure light of parallel sinusoid strips pattern that is projected onto the object under measurement.

8. The three-dimensional image measuring apparatus of claim 1, wherein the alignment mark comprises a single feature pattern for alignment, and the indicator module comprises a laser emission component for projecting the alignment mark.

9. The three-dimensional image measuring apparatus of claim 1, wherein the alignment mark comprises multiple feature patterns for alignment, and the indicator module comprises a plurality of laser emission components for projecting the alignment mark.

10. The three-dimensional image measuring apparatus of claim 1, wherein the calibration controlling module selects at least one of these reflection images, and determines whether the alignment mark in the selected reflection image departs from a predetermined position, so as to selectively drive the moving module to move the movable optical head.

11. The three-dimensional image measuring apparatus of claim 10, wherein when the alignment mark departs from the predetermined position, the calibration controlling module drives the moving module according to a departing direction and a departing distance of the alignment mark relative to the predetermined position.

12. A three-dimensional image measuring apparatus, comprising:
    a measurement platform for supporting an object under measurement; and a movable optical head located above the measurement platform, comprising:
  a beam splitter unit located above the measurement platform;
  a projecting module for generating a structure light of parallel sinusoid strips pattern, wherein the structure light of parallel sinusoid strips pattern is projected onto the object under measurement through the beam splitter unit;
  an image-capturing module comprising a plurality of image-capturing units, wherein the image-capturing units are located above the measurement platform facing the object under measurement respectively from different directions or angles, and each image-capturing unit is configured to capture a reflection image which is formed from the structure light of parallel sinusoid strips pattern reflected by the object under measurement; and
  an indicator module located above the measurement platform and obliquely facing the measurement platform, wherein the indicator module projects an alignment beam onto the object under measurement for forming an alignment mark;
a three-dimensional calculator module which calculates a three-dimensional image with respect to the object under measurement according to these reflection images;
a moving module operationally connected to the movable optical head for moving the movable optical head; and
a calibration controlling module which integrates these reflection images into an integrated image according to the respective alignment marks in these reflection images, and at least one part is captured from the integrated image to form a calibration image.

13. The three-dimensional image measuring apparatus of claim 12, wherein the image-capturing module comprises:
  a plurality of first image-capturing unit located above the measurement platform and obliquely facing the measurement platform, wherein each of the first image-capturing units is configured to capture an oblique reflection image which is formed from the structure light of parallel sinusoid strips pattern reflected by the object under measurement; and
  a second image-capturing unit which captures an image of the object under measurement from a vertical angle through the beam splitter unit to generate a forward reflection image from the structure light of parallel sinusoid strips pattern reflected by the object under measurement.

14. The three-dimensional image measuring apparatus of claim 13, wherein when the three-dimensional image measuring apparatus is in a three-dimensional measuring mode, the three-dimensional calculator module calculates the three-dimensional image with respect to the object under measurement according to the oblique reflection images.

15. The three-dimensional image measuring apparatus of claim 13, wherein when the three-dimensional image measuring apparatus is in a two-dimensional photography mode, the second image-capturing unit captures the forward reflection image as a two-dimensional image of the object under measurement.

* * * * *